US009433882B2

(12) United States Patent
Verschaeve et al.

(10) Patent No.: US 9,433,882 B2
(45) Date of Patent: Sep. 6, 2016

(54) METAL FIBER WEB BASED FILTER

(71) Applicant: NV BEKAERT SA, Zwevegem (BE)

(72) Inventors: Frank Verschaeve, Otegem (BE); Inge Schildermans, Marke (BE); Pavlos Papadopoulos, Awans (BE)

(73) Assignee: NV BEKAERT SA, Zwevegem (BE)

( * ) Notice: Subject to any disclaimer, the term of this patent is extended or adjusted under 35 U.S.C. 154(b) by 116 days.

(21) Appl. No.: 14/367,746

(22) PCT Filed: Feb. 4, 2013

(86) PCT No.: PCT/EP2013/052123
§ 371 (c)(1),
(2) Date: Jun. 20, 2014

(87) PCT Pub. No.: WO2013/124142
PCT Pub. Date: Aug. 29, 2013

(65) Prior Publication Data

US 2015/0211153 A1 Jul. 30, 2015

(30) Foreign Application Priority Data

Feb. 20, 2012 (EP) .................................... 12156132

(51) Int. Cl.
*B01D 39/12* (2006.01)
*B01D 39/20* (2006.01)

(52) U.S. Cl.
CPC ........... *B01D 39/12* (2013.01); *B01D 39/2041* (2013.01); *B01D 2239/0654* (2013.01); *B01D 2239/0672* (2013.01); *B01D 2239/1216* (2013.01); *B01D 2239/1225* (2013.01); *B01D 2239/1233* (2013.01); *B01D 2239/1291* (2013.01)

(58) Field of Classification Search
CPC .............................. D01G 15/84; D01G 15/88
See application file for complete search history.

(56) References Cited

U.S. PATENT DOCUMENTS 2,937,413 A * 5/1960 Hollingsworth ..... B23D 61/121 19/114
4,651,387 A * 3/1987 Giuliani ................ D01G 15/88 19/113

(Continued)

FOREIGN PATENT DOCUMENTS

EP 1018357 A1 7/2000
WO 2007/096128 A1 8/2007

OTHER PUBLICATIONS

International Search Report (ISR) dated Mar. 26, 2013, for PCT/EP2013/052123.

*Primary Examiner* — Shaun R Hurley
(74) *Attorney, Agent, or Firm* — Bacon & Thomas, PLLC

(57) ABSTRACT

A filter membrane has at its flow in side a first metal fiber web, at least two metal fiber layers, and a fine and at least one coarser fiber layer. The fine fiber layer is located at the flow in side of the filter membrane and the at least one coarser fiber layer is located downstream of the fine fiber layer. The filter membrane has at its flow out side, a stack of one or more first two-dimensional metal structures with constant and regular openings. The filter membrane also has at least one set formed by a second metal fiber web and a stack of one or more second two-dimensional metal structure with constant and regular openings; the at least one set is provided in between the stack of one or more two-dimensional metal structures that are having constant and regular openings, and the first metal fiber web.

13 Claims, 1 Drawing Sheet

100
110
123
127
144
142
154
152
132
134
120
140
150
130

(56) References Cited

U.S. PATENT DOCUMENTS

| | | | | | |
|---|---|---|---|---|---|
| 4,818,257 | A * | 4/1989 | Kennedy | B01D 39/2017 | 422/161 |
| 5,428,949 | A * | 7/1995 | Stahlecker | C23C 30/00 | 19/114 |
| 5,581,848 | A * | 12/1996 | Egerer | D01G 19/10 | 19/113 |
| 5,711,879 | A * | 1/1998 | Carlson | B01D 29/111 | 210/497.01 |
| 5,727,813 | A * | 3/1998 | Stratton | B01D 39/12 | 280/736 |
| 6,408,487 | B1 * | 6/2002 | Atkinson | D01G 15/88 | 19/114 |
| 6,510,947 | B1 * | 1/2003 | Schulte | B01D 29/012 | 175/66 |
| 2001/0037541 | A1 * | 11/2001 | Graf | D01G 15/88 | 19/114 |
| 2004/0128800 | A1 * | 7/2004 | Graf | D01G 15/88 | 19/114 |
| 2007/0114171 | A1 * | 5/2007 | Chen | B01D 29/15 | 210/489 |
| 2007/0220856 | A1 * | 9/2007 | Cho | B01D 39/2041 | 55/525 |
| 2008/0164221 | A1 * | 7/2008 | Brownstein | B01D 15/00 | 210/767 |
| 2009/0158558 | A1 * | 6/2009 | Marz | D01G 15/88 | 19/114 |
| 2011/0107732 | A1 * | 5/2011 | Schildermans | B01D 39/2041 | 55/482.1 |

* cited by examiner

METAL FIBER WEB BASED FILTER

BACKGROUND OF THE INVENTION

1. Technical Field

The invention relates to the field of metal fibre filters, filtration systems in which such filters are used; and the use of such filters and filtration systems, e.g. in hot gas filtration, in oil slurry filtration or in liquid filtration.

2. Background Art

Filtration systems are known in which the filter medium is provided by sintered metal powders. However the level of porosity that can be obtained with such sintered metal powders is too low for many applications. Sintered metal fibre filters have higher porosity levels and therefore a much better filtration performance. Hence sintered metal fibre filters are preferred solutions for many applications.

The method of manufacturing of sintered metal powder filters and of metal fibre filters is totally different. Metal powder can be provided in the shape of the final filter in a mould. If required, appropriate reinforcing means (such as metal screens or metal meshes) can be positioned in the mould as well. Subsequently, the whole is sintered into shape. Metal fibre filters need to be manufactured in a different way. Metal fibres are provided in two-dimensional fibre webs. Reinforcing layers (e.g. metal meshes) can be added. Such a stack can be sintered into a two dimensional plate structure that can be shaped afterwards, e.g. into a cylindrical structure wherein the seam is welded.

Sintered metal fibre filters are used in filtration systems, e.g. for filtration of hot gas, for liquid filtration or for filtration of oil slurries. In existing systems, the metal fibre filters (which can include one or more reinforcing layers such as meshes or expanded steel sheets) are supported over the surface of the filter by e.g. a welded metal wire structure (mostly a cage like structure, e.g. a cylindrical cage in the case of cylindrical filters).

An example is a filter assembly with a tubular or cylindrical filter element (comprising a sintered metal fibre web) and a cylindrical perforated core (e.g. a cylindrical structure made from metal wires in longitudinal and circumferential direction and which are welded at their contacting points). The cylindrical filter element is formed around the cylindrical perforated core. Both the cylindrical filter element and the cylindrical perforated core are affixed at their ends to end caps, e.g. by brazing, welding or gluing. It is a problem of such filtration systems that failure can occur after multiple back pulse cleaning of such filters.

SUMMARY OF THE INVENTION

The primary object of the invention is to provide a filter that does not show the drawbacks of the prior art. It is a specific object of the invention to provide a bonded (e.g. sintered) metal fibre filter that is better resistant to back pulse cleaning.

According to a first aspect of the invention a filter membrane is provided. The filter membrane is comprising at the flow in side of the filter membrane a first metal fibre web selected to act as filter medium. The first metal fibre web comprises at least two metal fibre layers: a fine fibre layer and at least one coarser fibre layer. With coarser fibre layer is meant that the average equivalent diameter of the metal fibres in the coarser fibre layer is higher than the average equivalent diameter of the metal fibres used in the fine fibre layer; and with fine fibre layer is meant that the average equivalent diameter of the metal fibres in the fine fibre layer is lower than the average equivalent diameter of the metal fibres used in the coarser fibre layer. The fine fibre layer is located at the flow in side of the filter membrane (and preferably at the flow in surface of the filter membrane) and the at least one coarser fibre layer is located downstream of the fine fibre layer. The filter membrane is further comprising, at the flow out side of the filter membrane, a stack of one or more first two-dimensional metal structures that are having constant and regular openings.

The filter membrane is further comprising at least one set formed by a second metal fibre web and a stack of one or more second two-dimensional metal structures with constant and regular openings, wherein the at least one set is provided in between on the one side the stack of one or more two-dimensional metal structures that are having constant and regular openings, and on the other side the first metal fibre web.

A second metal fibre web is in direct contact with the stack of one or more first two-dimensional metal structures.

One of the stacks of one or more second two-dimensional metal structures with constant and regular openings is in direct contact—at the side of the at least one coarser fibre layer of the first metal fibre web—with the first metal fibre web selected to act as filter medium.

The one or more first two-dimensional metal structures, the first metal fibre web, and the at least one set of second metal fibre web and one or more second two-dimensional metal structures; are all connected to each other by means of metallic bonds (e.g. by means of sintered bonds or by means of welded bonds). In a preferred embodiment, the filter membrane can be deformed to be used in a cylindrical filter.

The filter membrane has sufficient strength for unsupported use in filtration. It means that the filter membrane does not need to be supported over its filtration surface, while being able to be used in an efficient way.

Filters can be made with the filter membrane according to the invention. Preferably, the filter membrane is used without pleating the filter membrane. The filter membrane can also be bent to shape it for use as a cylindrical or tubular filter.

The synergetic structural and design characteristics of the filter membrane ensure long lifetime under back pulse cleaning filtration conditions.

It is an additional benefit of filters with filtration membranes according to the invention that back pulse cleaning is more efficient; the residual pressure drop is lower compared to using filtration membranes as in the state of the art. The residual pressure drop is the pressure over the filter element after a back pulse cleaning has been performed.

With two-dimensional metal structure with constant and regular openings is meant a two-dimensional structure, made out of metal and that is having openings. The openings are present in the two-dimensional structure according to a constant and regular pattern.

Preferred examples of two-dimensional metal structures with constant and regular openings that can be used in the invention are woven wire meshes (meshes) or expanded metal sheets. Preferably, the woven wire meshes and/or expanded metal sheets used as two-dimensional metal structures with constant and regular openings are calendared.

Preferably, the second two-dimensional metal structure or structures have a lower or the same weight per unit of surface area than the first two-dimensional metal structure. Preferably, the second two-dimensional metal structure or structures have smaller or the same openings than the first two-dimensional metal structure.

Preferably, the equivalent fibre diameter of the metal fibres in the fine fibre layer of the first metal fibre web is between 0.5 and 25 μm, more preferably between 0.5 and 15 μm. With equivalent diameter of a fibre is meant the diameter of a circle that is having the same area as the cross section of a fibre. The equivalent fibre diameter is selected for effective filtration performance.

Preferably, the equivalent fibre diameter of the metal fibres in the coarser fibre layers of the first metal fibre web is between 12 and 50 μm. More preferably the metal fibres in the at least one coarser fibre layer of the first metal fibre web are having and equivalent diameter higher than 20 μm, e.g. higher than 25 μm, and preferably lower than 50 μm.

Preferably, the second metal fibre webs are comprising metal fibres that are having the same equivalent fibre diameter as or a larger equivalent fibre diameter than the metal fibres in the at least one coarser fibre layer of the first metal fibre web. Preferred equivalent metal fibre diameters are higher than 12 μm, and more preferably higher than 20 μm, e.g. higher than 25 μm, and preferably lower than 50 μm.

The second metal fibre webs can comprise multiple fibre layers, differing in design characteristics (e.g. different fibre diameters, different fibre length, different fibre cross section, different layer thickness, different porosity . . . ).

The preferred ranges for the equivalent diameter of the metal fibres in the different metal fibre webs are selected for optimum results when shaping the filter membrane (e.g. bending it to a cylindrical shape) and resistance against back pulse cleaning in use of the filter made with the filter membrane of the invention. It is the combination of fibres that contributes to the optimum properties and performance.

Preferably, the filter membrane is a surface filtration membrane; and/or preferably the filter membrane is used as surface filtration membrane. Particles are basically trapped on the surface of the fine fibre layer of the first metal fibre web. It is not the intention that particulates are trapped in the at least one coarser fibre layer of the first metal fibre web or in the second metal fibre web(s), but it cannot be excluded that some particles flow through the fine fibre layer of the first metal fibre web and are caught in layers of the filter membrane downstream of the fine fibre layer. The function of the at least one coarser fibre layer of the first metal fibre web and of the second metal fibre web(s) is basically an interface function.

In preferred embodiments, the metal fibres of the first metal fibre web and/or of the second metal fibre webs have an average length of at least 5 mm, preferably of at least 10 mm.

In a preferred embodiment, metal fibres are used that have a length over equivalent diameter ratio between 500 and 20000. In another preferred embodiment, metal fibres are used that have a length over equivalent diameter ratio between 40 and 80.

An example of metal fibres that can be used in the invention are stainless steel fibres (e.g. AISI 316 or AISI 304). Other preferred metal fibres are made out of nickel based alloys such as Hastelloy or Inconel.

Other preferred metal fibres are Fe—Cr—Al alloy based fibres (e.g. as known under the commercial name FeCrAlloy). A first group of Fe—Cr—Al based alloys comprises 15 to 25% Cr and 4 to 6% Al (all percentages are weight percentages). Preferably the Al content is between 4.8 and 5.7%. A preferred alloy composition is a Fe—Cr—Al based alloy further comprising Y. The Y content ranges from 0.03 to 0.5% and is preferably between 0.08 and 0.35%. Most preferably, the Y content is between 0.25 and 0.35%. Examples are steel grades under DIN 1.4767.

Another possible alloy composition of this group is a Fe-Cr-Al based alloy further comprising at least one additional element selected from the group consisting of Sc, Y, Ti, Zr, Hf, V, Nb, Ta and the lanthanides, for example La or Ce. The content of the additional element or the sum of the additional elements is between 0.01 and 1%.

Another group of Fe—Cr—Al based alloys comprises up to 15% Cr and 20 to 60% Al. These alloys further comprise at least one additional element selected from the group consisting of Sc, Y, Ti, Zr, Hf, V, Nb, Ta and the lanthanides.

The Fe—Cr—Al based alloys show fair corrosion resistance and high temperature resistance characteristics Metal fibres can be made via any way known in the field, e.g. can be bundle drawn, or machined, or shaved or made via extraction from a melt.

In a preferred embodiment, the stack of one or more first two-dimensional metal structures that are having constant and regular openings have a weight of less than 3.7 kg/m$^2$, preferably less than 1.5 kg/m$^2$, even more preferably less than 1 kg/m$^2$.

Preferably, the two-dimensional metal structures that are having constant and regular openings are made out of the same metal or metal alloy as the metal fibres in the metal fibre webs. This feature contributes in a synergetic way to improved resistance to back cleaning pulses.

In a preferred embodiment, the metal fibres in the metal fibre webs are substantially oriented in a plane parallel with the surface of the filter membrane. This can be obtained by manufacturing the metal fibre webs in the filter initially as flat two-dimensional fibre webs wherein the thickness is small compared to length and width and wherein the fibres are oriented predominantly in the plane. In an example, metal fibres are dry laid (e.g. by means of carding techniques or by means of air laying techniques) into a two-dimensional web, wherein the fibres are oriented substantially in the plane of the two-dimensional web rather than in the thickness direction of the two-dimensional web. An alternative method to manufacture one or more of the fibre webs used is wet webbing, especially useful for producing a web with metal fibres with a length over equivalent diameter ratio between 40 and 80.

The second aspect of the invention is a filter made with a filter membrane as in the first aspect of the invention. The filter can be a cylindrical filter. The filter can be a flat (planar) filter or the filter can have a conical shape or any other shape.

A third aspect of the invention is a filtration system using a filter membrane as described in the first aspect of the invention and wherein the filter membrane is not supported over its inflow surface nor outflow surface. With inflow and outflow surfaces are meant the surfaces of the filter membrane through which the fluid to be filtered enters and exits the filter membrane. The filter membrane can be supported at its edges, as it has to be fit into e.g. a housing. In filtration systems according to the prior art, the filter membrane is supported over its inflow and/or outflow surface, e.g. by a welded metal wire cage or by a perforated plate, this can be avoided in filtration systems according to the invention.

In preferred filtration systems according to the invention a filter membrane is not supported by a perforated support, but only supported at the edges of the filter membrane.

In preferred cylindrical filtration systems a cylindrical filter is not supported by a hollow perforated core tube nor cage, but is only supported at the edges of the cylindrical filter membrane.

A fourth aspect of the invention is a method for the production of a cylindrical filter (or tubular filter), wherein a filter membrane is provided as in the first aspect of the invention. In order to produce the filter membrane, the different layers of the filter membrane are put onto each other and the filter membrane is bonded via metallic bonds. The metallic bonds can be obtained e.g. by sintering or by welding in one or more bonding operations. This way, a filter membrane is obtained (preferably a flat two-dimensional filter membrane). The filter membrane is cut to size and is bent into a cylindrical shape. The (e.g. longitudinal) contacting edges of the bent filter membrane are bonded together (e.g. by welding, by sintering or by gluing or by brazing) in order to close the cylindrical shape. Preferably, the filter membrane is bonded in one single operation, e.g. in one single sintering operation or in one single welding operation.

In a similar way other shapes of filters can be made, e.g. conical filters.

Preferably, in producing a shaped filter (e.g. a cylindrical filter) end to end brazing or welding (without overlap) is performed at the contacting edges.

A fifth aspect of the invention is a method for filtration of a fluid. The method for filtration can be applied e.g. to gas, slurry oil or to liquids. In the method a filter membrane is used as in the first aspect of the invention or a filtration system is used as in the second aspect of the invention. The fluid is supplied at the flow in side of the filter membrane. With flow in side is meant the side of the filter membrane where the first metal fibre web is present. Back pulsing is used to clean the filter membrane.

When filtering gas, the gas can be a hot gas, e.g. with temperatures up to 900° C. Preferably, the filtration operates with a pressure drop of maximum 2 bar over the filter membrane.

DETAILED DESCRIPTION OF THE INVENTION

Figure 1:
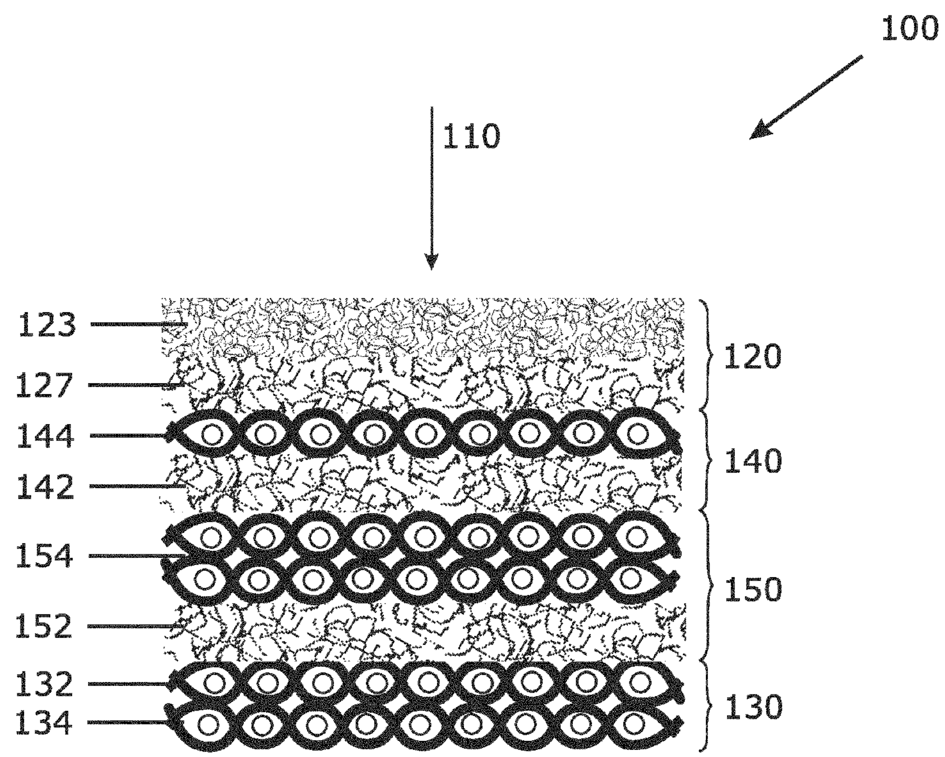
FIG. 1 shows an example of a filter membrane according to the invention.

FIG. 1 shows an example of a filter membrane 100 according to the invention. Arrow 110 is indicating the flow direction of the fluid when the filter membrane is being used in filtration. The filter membrane is comprising a first metal fibre web 120 selected to act as filter medium. The first metal fibre web 120 comprises a fine fibre layer 123 and a coarser fibre layer 127. The fine fibre layer 123 is located at the flow in side of the filter membrane 100 and the coarse fibre layer 127 is located downstream of the layer with fine metal fibres 123.

The filter membrane 100 is comprising at its flow out side, a stack 130 of (in this example) two first two-dimensional metal structures that are having constant and regular openings, in the example woven screens 132, 134.

In the example, the filter membrane 100 is comprising two sets 140, 150 formed by a second metal fibre web 142, 152 and a stack of one or more second two-dimensional metal structures with constant and regular openings (144, 154), in the example woven screens. The two sets 140 and 150 are provided in between on the one side said stack of one or more two-dimensional metal structures 130 that are having constant and regular openings, and on the other side said first metal fibre web 120.

One of the stacks of one or more second two-dimensional metal structure with constant and regular openings (in the example 144) is in direct contact—at the side of the coarse fibre layer 127—with the first metal fibre web 120.

The first two-dimensional metal structures 130, the first metal fibre web 120 and the sets 140, 150 of second metal fibre web 142, 152 and one or more second two-dimensional metal structures 144, 154; are all connected to each other by means of metallic bonds, e.g. created by a sintering process, preferably the bonds are created in one sintering operation.

Table I lists a number of examples of filter membrane compositions according to the invention. The table indicates for the first metal fibre web first the fine fibre layer, followed by the coarser fibre layer: e.g. in Example 1 "600 g/m$^2$ of 4 μm diameter on 300 g/m$^2$ of 22 μm diameter" means that the fine fibre layer is 600 g/m$^2$ of 4 μm diameter metal fibres and that the coarser fibre layer is 300 g/m$^2$ of 22 μm diameter metal fibres. With diameter in Table I is meant the equivalent diameter. In the examples, calendared meshes are used.

Preferably, the specific mass (expressed in g/m$^2$) of the fine fibre layer is higher than or equal to the specific mass (expressed in g/m$^2$) of the coarser fibre layer. This is not essential for the invention however. As an example in the same way a filter membrane composition according to the invention can be been made similar to example 4, but with a fine fibre layer of 250 g/m$^2$ of 12 μm diameter metal fibres and a coarser fibre layer of 300 g/m$^2$ of 22 μm diameter metal fibres. Explanation on the mesh (woven wire meshes) is provided in Table II. As an alternative to woven wire meshes, expanded metal plates or expanded metal sheets can be used, preferably calendared expanded metal plates or sheets.

TABLE I

Examples of filter membrane compositions according to the invention

| | Example 1 | Example 2 | Example 3 | Example 4 |
|---|---|---|---|---|
| First metal fibre web | 600 g/m$^2$ of 4 μm diameter on 300 g/m$^2$ of 22 μm diam. | 600 g/m$^2$ of 12 μm diam. on 225 g/m$^2$ of 22 μm diam. | 600 g/m$^2$ of 4 μm diam. on 300 g/m$^2$ of 22 μm diam. | 300 g/m$^2$ of 12 μm diam. on 225 g/m$^2$ of 22 μm |
| Sets formed by a 2nd metal fibre web and a stack of 1 or more 2nd 2-dim. metal | One set, formed by a K-mesh on a 300 g/m$^2$ metal fibre web of 22 μm | Two sets, each comprising one K-mesh 225 g/m$^2$ metal fibre web of 22 μm | One set, formed by a K-mesh on a 225 g/m$^2$ metal fibre web of 22 | Two sets, each comprising one K-mesh 225 g/m$^2$ metal fibre |

TABLE I-continued

Examples of filter membrane compositions according to the invention

| | Example 1 | Example 2 | Example 3 | Example 4 |
|---|---|---|---|---|
| structures with constant and regular openings | diameter fibres | diameter | μm diameter fibres | web of 22 μm diameter |
| stack of 1 or more first 2-dim. metal structures with constant and regular openings | One 12 mesh | One K-mesh | One 12 mesh | One K-mesh |
| Comment | All layers in AISI 316L | All layers in FeCrAlloy (DIN 1.4767) | | |

TABLE II

Examples of woven wire mesh that can be used in the invention

| Mesh type | J mesh | K-mesh | S-mesh | 12 mesh |
|---|---|---|---|---|
| Mesh (number of cells per inch, one inch is 25.4 mm) | 50 | 40 | 48 | 12 |
| Aperture (in mm) | 0.318 | 0.400 | 0.400 | 1.32 |
| Wire diameter (in mm) | 0.190 | 0.250 | 0.125 | 0.8 |
| weight (g/m$^2$) | 910 | 1220 | 380 | 3450 |
| Mesh thickness (in mm +/− 0.02 mm) | 0.380 | 0.500 | 0.250 | |
| Thickness of calendared mesh (mm) | 0.280 | 0.400 | 0.140 | 1.25 |

Figure 2:
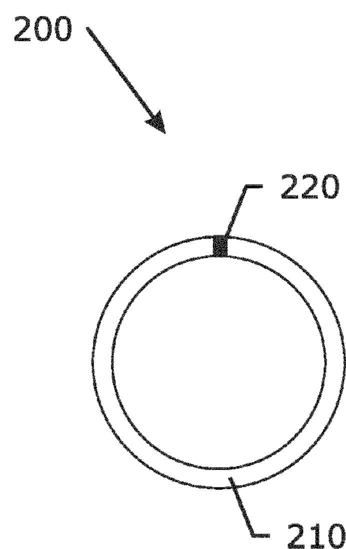
FIG. 2 shows a top view of an example of a cylindrical filter using a filter membrane according to the invention.

FIG. 2 shows a top view of a cylindrical filter 200 made from a filter membrane 210 according to the invention, e.g. the filter membrane shown in FIG. 1 or the filter membranes described in Table I. A flat (two dimensional) filter membrane is bent into a cylindrical shape, with the first metal fibre web at the outer diameter of the cylindrical filter 210. A weld 220 is made to close the cylindrical filter where the edges of the filter membrane touch each other.

Figure 3:
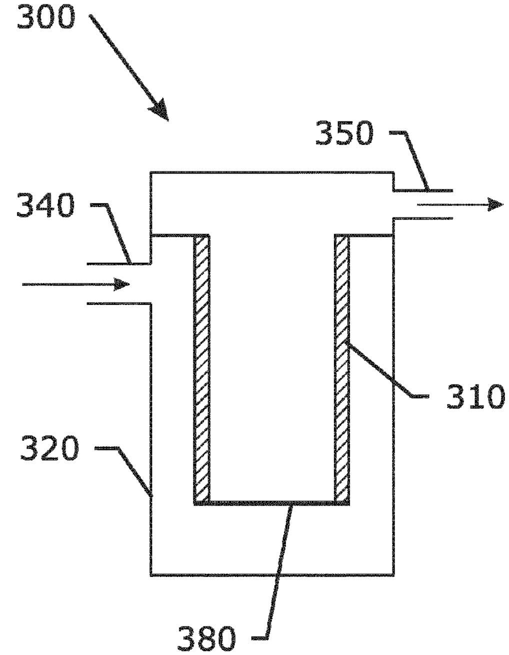
FIG. 3 shows a filtration system using a filter membrane according to the invention.

FIG. 3 shows a filtration system 300 using a cylindrical filter 310 made from a filter membrane according to the invention, e.g. the cylindrical filter as in FIG. 2. The cylindrical filter 310 is not supported over its filtration surface. The cylindrical filter is fitted in a housing 320, which has an inlet 340 and an outlet 350 for the fluid to be filtered. The cylindrical filter 310 is provided with an impermeable end cap 380, connected to it e.g. by welding.

The flow of the fluid in filtration is from the outside to the inside of the cylindrical filter 310, with the first metal fibre web positioned at the outer surface of the cylindrical filter 310.

In use, the cylindrical filter is cleaned by means of back pulse cleaning.

The invention claimed is:

1. A filter membrane comprising at a flow in side of the filter membrane a first metal fibre web selected to act as filter medium, wherein said first metal fibre web comprises at least two metal fibre layers, a fine fibre layer and at least one coarser fibre layer, wherein the fine fibre layer is located at the flow in side of said filter membrane and the at least one coarser fibre layer is located downstream of said fine fibre layer, said filter membrane further comprising at a flow out side of the filter membrane, a stack of one or more first two-dimensional metal structures that have constant and regular openings, said filter membrane further comprising at least one set formed by a second metal fibre web and a stack of one or more second two-dimensional metal structures with constant and regular openings, wherein said at least one set is provided in between on one side said stack of one or more two-dimensional metal structures that have constant and regular openings, and on the other side said first metal fibre web, wherein the second metal fibre web is in direct contact with the stack of one or more first two-dimensional metal structures, wherein one of said stacks of one or more second two-dimensional metal structures with constant and regular openings is in direct contact with the first metal fibre web at the side of said at least one coarser fibre layer; and wherein said one or more first two-dimensional metal structures, said first metal fibre web, and said at least one set of second metal fibre web and one or more second two-dimensional metal structures; are all connected to each other by means of metallic bonds.

2. The filter membrane of claim 1, wherein the equivalent fibre diameter of the metal fibres in said fine fibre layer of said first metal fibre web is between 0.5 and 25 μm.

3. The filter membrane as in claim 1, wherein the stack of one or more first two-dimensional metal structures that are having constant and regular openings has a weight of less than 3.7 kg/m'.

4. The filter membrane as in claim 1, wherein said first two-dimensional metal structures that are having constant and regular openings and/or said second two-dimensional metal structures that are having constant and regular openings are woven wire screens or are expanded metal sheets.

5. A filter, comprising a filter membrane as in claim 1, wherein the filter is a cylindrical filter.

6. A filter, comprising a filter membrane as in claim 1, wherein the filter is a flat filter.

7. A filtration system using a filter membrane as in claim 1, wherein said filter membrane is not supported over its inflow surface nor over its outflow surface, but only at edges of said filter membrane.

8. A method for the production of a cylindrical filter, wherein a filter membrane as in claim 1 is made, wherein the different layers of said filter membrane are put onto each other and the filter membrane is bonded via metallic bonds, the filter membrane is cut to size and is bent into a cylindrical shape, and the contacting edges of the bent filter membrane are bonded together in order to close the cylindrical shape.

9. The method of claim 8, wherein the filter membrane is bonded in one single sintering or welding operation.

10. The method as in claim 8, wherein at the contacting edges, end to end welding or brazing is performed.

11. A method for the filtration of a fluid, wherein a filter membrane as in claim 1 is provided in a filter, wherein the fluid to be filtered is supplied at the flow in side of said filter membrane, wherein back pulsing is used to clean the filter membrane.

12. A method for the filtration of a fluid, wherein a filtration system is provided as in claim 7, wherein the fluid to be filtered is supplied at the flow in side of said filter membrane; and wherein back pulsing is used to clean the filter membrane.

13. The filter membrane according to claim 1, wherein the metal fibres in the metal fibre webs are oriented in a plane parallel with a surface of the filter membrane.

* * * * *